US012466183B2

(12) United States Patent
McAvoy et al.

(10) Patent No.: US 12,466,183 B2
(45) Date of Patent: Nov. 11, 2025

(54) PRINTHEAD ASSEMBLY

(71) Applicant: 3C PROJECT MANAGEMENT LIMITED, Greystones (IE)

(72) Inventors: Gregory John McAvoy, Greystones (IE); Richard Coull, Greystones (IE)

(73) Assignee: 3C PROJECT MANAGEMENT LIMITED, Greystones (IE)

( * ) Notice: Subject to any disclaimer, the term of this patent is extended or adjusted under 35 U.S.C. 154(b) by 128 days.

(21) Appl. No.: 18/269,684

(22) PCT Filed: Dec. 29, 2021

(86) PCT No.: PCT/EP2021/087776

§ 371 (c)(1),
(2) Date: Jun. 26, 2023

(87) PCT Pub. No.: WO2022/144383

PCT Pub. Date: Jul. 7, 2022

(65) Prior Publication Data

US 2024/0059062 A1 Feb. 22, 2024

(30) Foreign Application Priority Data

Dec. 31, 2020 (EP) .................................... 20217957

(51) Int. Cl.
*B41J 2/14* (2006.01)
*B41J 2/16* (2006.01)

(52) U.S. Cl.
CPC ....... *B41J 2/14233* (2013.01); *B41J 2/14427* (2013.01); *B41J 2/1628* (2013.01); *B41J 2202/19* (2013.01); *B41J 2202/20* (2013.01)

(58) Field of Classification Search
CPC .. B41J 2/14233; B41J 2/14427; B41J 2/1628; B41J 2202/19; B41J 2202/20; B41J 2002/1437; B41J 2002/14435
See application file for complete search history.

(56) References Cited

U.S. PATENT DOCUMENTS

2014/0063095 A1 3/2014 Yokoyama et al.

FOREIGN PATENT DOCUMENTS

EP 0431692 A1 6/1991
EP 0486256 A2 5/1992
(Continued)

OTHER PUBLICATIONS

Witteveen, Bontko, "Stackable Drop Generator For An Ink-jet Printer" (EP 0 431 692), Apr. 12, 1995, [Whole Document] (Year: 1995).*

(Continued)

*Primary Examiner* — Lisa Solomon

(74) *Attorney, Agent, or Firm* — Ware, Fressola, Maguire & Barber LLP

(57) ABSTRACT

The present disclosure provides a printhead assembly comprising: a plurality of printhead modules (100*a*), including a first printhead module, a second printhead module and a third printhead module. Each of the plurality of printhead modules (100*a*) comprises: a plurality of printhead nozzles (126) each provided with an actuator (118) for selectively ejecting print agent therefrom; at least one print agent manifold (122, 124) providing a fluid communication pathway between at least one print agent inlet and the plurality of printhead nozzles (126); and control circuitry (104) to control the actuators (118) of the printhead module (100*a*) to eject print agent from the printhead nozzles (126). The first printhead module is mounted to the third printhead module via the second printhead module.

14 Claims, 7 Drawing Sheets

(56) References Cited

FOREIGN PATENT DOCUMENTS

| | | | | |
|---|---|---|---|---|
| EP | 0431692 | B1 | * | 4/1995 |
| GB | 2520745 | A | | 6/2015 |
| JP | 2001162794 | A | | 6/2001 |
| JP | 2004209655 | A | | 7/2004 |
| JP | 2007276427 | A | | 10/2007 |
| JP | 2018008398 | A | | 1/2018 |
| JP | 2020001333 | A | | 1/2020 |
| TW | 200904639 | A | | 2/2009 |
| WO | 9614212 | A1 | | 5/1996 |
| WO | 9742034 | A1 | | 11/1997 |
| WO | 2009015406 | A1 | | 2/2009 |

OTHER PUBLICATIONS

Written Opinion and International Search Report, Application No. PCT/EP2021/087776, Mailed Jun. 24, 2022 (20 pages).

* cited by examiner

PRINTHEAD ASSEMBLY

FIELD OF THE INVENTION

The present invention relates to a printhead assembly, a printhead module and a method of manufacturing the printhead module. In particular, the present invention relates to printheads having piezoelectric-actuated printhead nozzles

BACKGROUND TO THE INVENTION

It is known to manufacture printheads for controllably ejecting print agent from a plurality of printhead nozzles.

Typically, the printhead assembly is formed from a printhead manifold providing fluid communication between one or more bulk reservoirs for storing the print agent and each of the plurality of printhead nozzles. The plurality of printhead nozzles are mounted to the printhead manifold individually, or in groups. Each printhead nozzle includes an actuator (e.g., a piezoelectric actuator) to control ejection of print agent therefrom.

To ensure precise and accurate printing using the printhead, it is important that each printhead nozzle is mounted in a predetermined position on the printhead manifold. Thus, it is typically necessary for highly precise manufacturing methods to be used.

It is in this context that the present invention has been devised.

SUMMARY OF THE INVENTION

In accordance with an aspect of the present invention, there is provided a printhead assembly comprising a plurality of printhead modules, including a first printhead module, a second printhead module and a third printhead module. Each of the plurality of printhead modules comprises: a plurality of printhead nozzles each provided with an actuator for selectively ejecting print agent therefrom; at least one print agent manifold (e.g. a print agent manifold, or a plurality of print agent manifolds) providing a fluid communication pathway between at least one print agent inlet (e.g. a print agent inlet, or a plurality of print agent inlets) and the plurality of printhead nozzles; and control circuitry to control the actuators of the printhead module to eject print agent from the printhead nozzles. The first printhead module is mounted to the third printhead module via the second printhead module.

Thus, required relative positioning of printhead nozzles to adjacent printhead nozzles can be achieved more precisely, taking account of manufacturing tolerance. By mounting printhead modules to each other, instead of mounting to a common scaffold, any errors in the relative position of adjacent printhead nozzles can be dependent on the manufacturing tolerances of the individual printhead modules, rather than placement errors between independent placement of two separate nozzles. Furthermore, large printhead assemblies can be easily manufactured by providing additional printhead modules connected in series. In contrast, the prior art solution requires that the structural scaffold, to which each printhead module is connected, is manufactured to the required size of the printhead assembly. By mounting the printhead modules to each other, there is no longer a requirement to manufacture a large component with many (sometimes many thousands) of connection ports all precisely located. Although the printhead assembly of the present invention can be mounted to a further component, such as a structural scaffold, it will be understood that any further connections need not be as precise, and/or will not have such a detrimental effect on the output from the printer including the printhead assembly, because the relative location of the printhead nozzles between adjacent printhead modules are already defined.

It will be understood that a printhead assembly is a component for use in a printer, comprising a plurality of printhead modules which can be connected together during manufacture.

In some examples, each printhead module is to print only a single print agent from the plurality of printhead nozzles. In other examples, a first subset of the plurality of printhead nozzles are for ejecting a first print agent therefrom and a second subset of the plurality of printhead nozzles are for ejecting a second print agent therefrom. The second subset may be distinct from the first subset. In this way, a single printhead module may be used for printing with a plurality of print agents. Where a plurality of print agents can be printed from the single printhead module, it will be understood that the print agent manifold may provide a fluid communication pathway between a plurality of separate print agent inlets and the respective printhead nozzles associated with each separate print agent among the plurality of printhead nozzles.

The print agent manifold is substantially any routing for print agent through the printhead module. Typically, the print agent manifold is defined by one or more channels in the printhead module.

It may be that each printhead nozzle is connected to only one among the plurality of print agent manifolds.

The printhead nozzle is an opening defined in the printhead module and through which print agent can be controllably ejected by operation of the actuator controlled by the control circuitry. Typically, the printhead nozzles have a cross-sectional extent of less than 1 millimetres, for example less than 0.1 millimetres.

The actuator may be a piezoelectric actuator. Thus, operation of the piezoelectric actuator for the respective printhead nozzle may be used to controllably eject print agent from the respective printhead nozzle. Use of a piezoelectric actuator allows a simple, precisely controllable printhead assembly to be provided.

It will be understood that the actuator typically operates to cause displacement of a resiliently deformable membrane defining at least a portion of the printhead nozzle in such a way as to cause ejection of print agent from the printhead nozzle on operation of the actuator.

By providing the control circuitry as part of the printhead module, again this facilitates a modular nature of construction of the printhead assembly. Furthermore, the complexity of wiring connections in the printhead assembly can be reduced, because separate control wiring to each actuator need only be provided from the control circuitry on each printhead module; the control instructions for any actuators on a printhead module can be provided onto the printhead module via a single wiring connection to the control circuitry on the printhead module. Additionally, where the control circuitry is distributed onto the printhead modules (instead of only located centrally for the printhead assembly) the heat generation from the control circuitry can be distributed across all of the printhead modules, improving heat management for the printhead assembly.

The control circuitry may comprise an integrated circuit, for example a complementary metal oxide semiconductor, CMOS, circuit. The control circuitry may be integrally formed with the printhead nozzles. In other words, formation of the control circuitry, the printhead nozzles and (optionally) the piezoelectric actuators can be provided at the same time, without requiring assembly of multiple component parts assembled separately. By providing the control circuitry using an integrated circuit, the control circuitry can be provided adjacent the printhead nozzles, thereby ensuring the printhead modules are compact.

It may be that the control circuitry comprises (a) a digital register. It may be that the control circuitry comprises (b) a nozzle trimming calculation circuit and/or register. It may be that the control circuitry comprises (c) a temperature measurement circuit. It may be that the control circuitry comprises (d) a fluid chamber fill detection circuit.

The digital register may be a shift register, or a latch register, for example. In operation, it may be that data is stored in or read from a register within the control circuitry. In operation, it may be that temperature is measured using a temperature sensitive component of the temperature measurement circuit. In operation, it may be that the fill level of a fluid chamber is measured.

It may be that the control circuitry is configured to modify the voltage pulses applied to one or more electrodes of one or more piezoelectric actuators responsive to data stored by the control circuitry or measurements from one or more sensors, which are typically within the printhead module. In operation, it may be that the control circuitry measures the voltage pulses applied to one or more electrodes of one or more piezoelectric actuators responsive to data stored by the control circuitry or measurements from one or more sensors, which are typically within the printhead module.

Modifying the voltage pulses may comprise shifting them in time. Modifying the voltage pulses may comprise compressing or expanding them. Modifying the voltage pulses may comprise modifying their magnitude. Modifying the voltage pulses may comprise swapping between a plurality of (typically repeating) sequences of received actuator drive pulses with different profiles. The control circuitry is typically configured to modify the voltage pulses applied to one or more electrodes of one or more individual piezoelectric actuators responsive to data relating to that individual piezoelectric actuator stored by the control circuitry or measurements from one or more sensors.

It may be that the control circuitry comprises an ejection transistor. The ejection transistor is typically in direct electrical communication (without intervening switched semiconductor junction) with an electrode of the piezoelectric actuator. In operation, it may be that the ejection transistor is controlled to cause a potential output from the ejection transistor to be applied directly to an electrode of the piezoelectric actuator.

The control circuitry may be configured to receive input control signals from outside the printhead module and to output actuator control signals to each of the plurality of actuators to control ejection of print agent from the plurality of printhead nozzles.

It may be that the printhead module comprises an electrical input for receiving actuator drive pulses. In operation, the printhead module may receive actuator drive pulses.

The printhead assembly may comprise a controller for controlling the printhead modules of the printhead assembly. The controller may comprise one or more microcontrollers or microprocessors, which may be integrated or distributed, in communication with or comprising a memory storing program code.

It may be that the controller comprises a pulse generator configured to generate (typically a sequence of) actuator drive pulses. Each printhead module typically comprises an electrical input connected to the controller through which the actuator drive pulses are received. In operation, the printhead assembly may generate actuator drive pulses (e.g. in a controller) and conduct them to the printhead module through an electrical connection. Typically, for one or more printhead modules, the drive pulses are conducted to the respective printhead module via one or more other printhead modules. Typically, the second printhead module is configured to conduct the actuator drive pulses from the first printhead module to the third printhead module.

The actuator drive pulses are typically analogue signals. The actuator drive pulses typically comprise periodic repeating voltage waveforms.

It may be that the control circuitry is configured to switchedly connect or disconnect at least one electrode of the or each of a plurality of piezoelectric actuators to the received actuator drive pulses to thereby selectively actuate the piezoelectric actuators. In operation, it may be that the printhead module switchedly connects or disconnects at least one electrode of the or each of a plurality of piezoelectric actuators to the received actuator drive pulses to thereby selectively actuate the piezoelectric actuators.

It may be that the controller comprises one or more pulse generators which generate a plurality of sequences of actuator drive pulses, and electrical inputs of the printhead module receive the plurality of sequences of actuator drive pulses (generated by the one or more pulse generators) through a plurality of electrical connections to the controller, and the control circuitry is configured to switchedly connect or disconnect at least one electrode of the or each of a plurality of piezoelectric actuators to received actuator drive pulses selected from a plurality of different received sequences of actuator pulses. In operation, it may be that the printhead assembly generates a plurality of different sequences of actuator drive pulses (e.g. in a controller) and conducts them to the printhead module through separate electrical connections, and switchedly connects or disconnects at least one electrode of the or each of a plurality of piezoelectric actuators to one or more received actuator drive pulses received from a variable (and selectable) one of the plurality of different sequences of actuator drive pulses.

The selection as to which received sequence of actuator pulses at least one electrode of piezoelectric actuator is connected to may be responsive to stored data specific to the respective piezoelectric actuator and/or responsive to measurements of operation of the respective piezoelectric actuator. Accordingly, the control circuitry can typically select whether or not each piezoelectric actuator ejects a droplet at each of a sequence of periodic droplet ejection decision points. By a decision point we refer to a time prior to the start of an actuator drive pulses where it is determined whether or not to communicate that actuator drive pulse to at least one electrode of a specific piezoelectric actuator. In some embodiments the CMOS control circuits can also select, and the method typically comprises selecting, which actuator pulse, from amongst a plurality of actuator pulses, (from the same or different streams of actuator pulses) is applied to at least one electrode of a respective piezoelectric actuator at each said droplet ejection decision point.

Typically, the actuator drive pulses repeat periodically. It may be that the actuator drive pulses are amplified by the controller. It may be that the actuator drive pulses are not amplified by the printhead module. It may be that the printhead module does not generate actuator drive pulses.

Typically pulses from the pulse generator are conducted to a plurality of control circuits, which may be part of a plurality of printhead modules. Thus a single pulse generator circuit may drive multiple piezoelectric transducers on the same substrate and/or multiple printhead modules having separate substrates, each having multiple piezoelectric transducers.

The digital actuation control signals are typically received from a controller. The digital actuation control signals are typically received through a flexible connector. The digital actuation control signals may be received in serial form and converted to parallel control signals using a shift register within the control circuitry.

It may be that the controller comprises a pulse generator configured to generate actuator drive pulses which are conducted to the printhead module (or a plurality of printhead modules) and digital control signals which are conducted to the printhead module (or a plurality of printhead modules) and the digital control signals are processed in the control circuitry of the printhead module(s) to determine which actuator drive pulses are conducted to at least one electrode of the piezoelectric actuator or piezoelectric actuators of the one or more printhead modules to cause droplet ejection.

In operation, it may be that the printhead assembly generates actuator drive pulses (e.g. at a controller) and digital control signals, and conducts both the actuator drive pulses and the digital control signals to the control circuitry of the printhead module(s) and the control circuitry processes the digital control signals and, responsive thereto, conducts selected actuator drive pulses to at least one electrode of the piezoelectric actuator or piezoelectric actuator of the one or more printhead modules to cause droplet ejection.

Thus, typically analogue actuator drive pulse and digital control signals are input by the control circuitry (and typically by the printhead modules). Typically the digital control signals are used to selectively switch the analogue actuator drive pulses to thereby selectively transmit them to the piezoelectric actuators.

In some embodiments, the control circuitry is configured to switchedly connect one or more of ground and a single fixed non-zero voltage line, or multiple fixed voltage lines of different voltages (one or more of which may be ground) to one or both electrodes of a piezoelectric actuator to cause droplet ejection of print agent. For example, the control circuitry may switch an electrode between a connection to ground and a connection to a fixed voltage or multiple fixed voltage lines of different voltages and back to ground again in order to cause a droplet ejection. Typically, the second printhead module is configured to conduct a said ground and/or a said single fixed non-zero voltage from the first printhead module to the third printhead module.

Switching an electrode between a connection to ground and a connection to a fixed voltage or between fixed voltage lines may comprise operating a latch.

It may be that the control circuitry is configured to individually and selectively actuate at least three (or at least four) said piezoelectric actuator elements formed by one or more said layers on the same substrate and defining part of different respective fluid chambers (with different respective droplet ejection outlets, sometimes referred to as printhead nozzles), optionally wherein the said at least three (or at least four) actuator elements are configured for ejecting fluid of different colours or compositions or as redundant droplet ejection outlets.

It may be that the said at least three (or at least four) piezoelectric actuator elements are located on the substrate (optionally adjacent each other, optionally in a row) and the control circuitry is connected to a flexible printhead cable having one or more electrical signal conductors, wherein the control circuitry is configured to individually and selectively actuate the actuator elements of the at least three (or at least four) piezoelectric actuator elements responsive to actuation commands received through the same signal conductor.

Thus, due to the integration of the control circuitry which is configured to drive at least three (or at least four) actuator elements, an individual signal conductor may transmit a control signal leading to the actuation of individual actuator elements of the at least three (or at least four) piezoelectric actuator elements. Typically the control signals are digital control signals.

The at least three (or at least four) piezoelectric actuator elements may comprise or are a group of piezoelectric actuator elements, for example a group of piezoelectric actuator elements which are configured to eject fluid of the same colour or composition (for example have fluid chambers in fluid communication with the same fluid supply), or fluid of different colours or compositions (for example have fluid chambers in fluid communication with separate fluid supplies), or a group of piezoelectric actuator elements which are divided into a plurality of (typically at least three or at least four) sub-groups, wherein the piezoelectric actuator elements in each sub-group are configured to eject fluid of the same colour or composition (for example have fluid chambers in fluid communication with the same fluid supply) and the piezoelectric actuator elements of some or all of the sub-groups are configured to eject fluid of different colours or compositions (for example are in fluid communication with separate fluid supplies). Piezoelectric actuator elements in the same sub-group may be arranged in an array and there may be a plurality of arrays for respective sub-groups.

It may be that the control circuitry is configured to individually and selectively actuate at least double the number of piezoelectric actuator elements than signal conductors through which the control circuitry receives actuation control signals.

It may be that the said control circuitry is configured to individually and selectively actuate at least 128 (or at least 256) piezoelectric actuator elements and the control circuitry receives actuation control signals through at most 32 (or at most 16) signal conductors.

The control circuitry may comprise a serial to parallel conversion circuit configured to convert a digital signal received in serial form through one or more signal conductors into a selection of piezoelectric actuators to be actuated to carry out a droplet ejection simultaneously (i.e. in parallel). The serial to parallel conversion circuit typically comprises one or more shift registers.

The first printhead module may be configured to be electrically connected to the third printhead module via the second printhead module. It may be that the third printhead module is configured to receive actuation control signals (e.g. digital control signals) via the second printhead module and the first printhead module. Thus, actuator control signals can be input to the first printhead module and relayed by the first printhead module to further printhead modules connected thereto, for example via the further printhead modules connected thereto.

Each of the printhead modules may receive electric power to power the actuators separately from the actuation control signals. The third printhead module may be configured to receive electrical power via the second printhead module and the first printhead module.

The print agent manifold of the first printhead module may be different from the print agent manifold of the second printhead module. Thus, the first printhead module may be for a different purpose within the printhead assembly, compared with the second printhead module. It may be that a shape of the print agent manifold of the first printhead module is different to a shape of the print agent manifold of the second printhead module. It may be that one or more internal surface characteristics (such as a surface roughness) of the print agent manifolds differ between the first printhead module and the second printhead module. In other words, the print agent manifold of the first printhead module may be configured for use with a first print agent and the print agent manifold of the second printhead module may be configured for use with a second print agent, different to the first print agent. In some examples, the internal surface of the print agent manifold may be matched to the print agent to be provided thereto.

The first printhead module may be configured to be operatively coupled to a first print agent to be ejected by a first subset of the plurality of printhead nozzles of the first printhead module, and may be further configured to be operatively coupled to a second print agent to be ejected by a second subset of the plurality of printhead nozzles of the second printhead module. The second print agent may be different from the first print agent. The second subset may be distinct from the first subset.

Typically, the first printhead module is configured to be operatively coupled to the first print agent via a first print agent inlet of the first printhead module, and to be operatively coupled to the second print agent via a second print agent inlet of the first printhead module.

Thus, the first printhead module may be configured to connect a plurality of print agents to the plurality of printhead nozzles, to allow ejection of any of the plurality of print agents from the plurality of printhead nozzles. Typically, any given printhead nozzle is configured to selectively eject therefrom only one print agent among the plurality of print agents.

In one example, the plurality of print agents is greater than two print agents. The plurality of print agents may be less than ten print agents. In some examples, the plurality of print agents is four print agents. Each of the print agents may have a different composition. Where the print agents are inks, each of the plurality of print agents may be a different colour.

The printhead assembly may further comprise a first module connector for connecting the first printhead module to the second printhead module. The printhead assembly may further comprise a second module connector for connecting the second printhead module to the third printhead module. Thus, there can be intermediate connectors between the printhead modules, but the first printhead module is still nevertheless connected to the third printhead module via the second printhead module.

In some examples, the first printhead module may be connected directly to the second printhead module, and the second printhead module may be connected directly to the third printhead module. In other words, the first printhead module may be connected to the third printhead module via only the second printhead module between the first printhead module and the third printhead module.

The print agent manifold of the second printhead module may be arranged to receive the print agent at the print agent inlet from a print agent outlet of the first printhead module. The print agent outlet of the first printhead module may be in fluid communication with the print agent inlet of the second printhead module. Thus, print agent may be provided to the printhead modules via other printhead modules. In this way, it will be understood that a wider extent of a printhead assembly can be provided by simply providing further printhead modules, with no requirement for an increase in the number of print agent sources to the plurality of printhead modules.

The print agent manifold of the second printhead module may be arranged to receive the print agent at the print agent inlet from a print agent outlet defined in a further print agent manifold, different from the plurality of printhead modules. Thus, the print agent can be supplied to the second printhead module via the further print agent manifold, typically not via any other printhead module in the plurality of printhead modules.

Each printhead module may comprise at least 10 printhead nozzles. Each printhead module may comprise at least 100 printhead nozzles. Each printhead module may comprise at least 1000 printhead nozzles. Each printhead module may comprise at least 3000 printhead nozzles.

The plurality of printhead modules may comprise at least 10 printhead modules. The plurality of printhead modules may comprise at least 100 printhead modules.

The third printhead module may be electrically connected to the first printhead module via the second printhead module. Thus, electrical signals to be received by any of the third printhead module, the second printhead module or the first printhead module, can be supplied to the first printhead module and relayed onwards to the second printhead module, from where they are further relayed to the third printhead module. The control circuitry of the third printhead module may be electrically connected to the first printhead module via the second printhead module. In this way, control signals supplied to the first printhead module can be received by the control circuitry of the third printhead module.

The plurality of printhead modules may be arranged in a tessellating pattern. Thus, the printhead modules can efficiently fit together without any gaps to ensure a high number of printhead modules can be provided in the space.

The plurality of printhead modules may together have a plurality of different external shapes, the plurality of different external shapes being less than the number of printhead modules. Thus, there may be a number of repeating external shapes of the plurality of printhead modules. It may be that each of the plurality of different external shapes occurs more than once in the plurality of printhead modules. Thus, a plurality of printhead modules can be produced having each different external shape and used together to form the printhead assembly.

The plurality of printhead modules may each have a substantially identical external shape. Thus, the external shape of the printhead modules is identical, making it easier to form the printhead assembly from the plurality of printhead modules. It will be understood that even where the plurality of printhead modules have the same external shape, they can have different internal configuration to provide different functionality for one or more of the printhead modules forming a subset among the plurality of printhead modules.

This in itself is believed to be novel and so, in accordance with another aspect of the present invention, there is provided a first printhead module for connection to a further printhead module having a substantially identical external shape as the first printhead module. The first printhead module comprises: a plurality of printhead nozzles each provided with an actuator for selectively ejecting print agent therefrom; at least one print agent manifold (e.g. a print agent manifold, or a plurality of print agent manifolds) providing a fluid communication pathway between at least one print agent inlet (e.g. a print agent inlet, or a plurality of print agent inlets) and the plurality of printhead nozzles; control circuitry to control the actuators to eject print agent from the printhead nozzles; and a connection portion arranged to facilitate mounting of the first printhead module to the further printhead module.

Thus, there is provided a printhead module which can be connected with other printhead modules in a modular arrangement to provide a printhead assembly.

Viewed from another aspect, there is provided a method of manufacturing a printhead module. The method comprises: forming an integrated control circuit in a substrate; forming a plurality of piezoelectric actuators each in electrical communication with the integrated control circuit; forming a plurality of nozzle outlets, each associated with a respective one of the plurality of piezoelectric actuators; and forming at least one print agent manifold (e.g. a print agent manifold, or a plurality of print agent manifolds) defining a fluid communication pathway between at least one print agent inlet (e.g. a print agent inlet, or a plurality of print agent inlets) and the plurality of nozzle outlets.

Thus, in the context of a printhead assembly having a plurality of piezoelectrically-actuated nozzle outlets, there can be provided a method of manufacturing a modular system of printhead modules. This is enabled by integrally forming the integrated control circuit to connect to and control the plurality of piezoelectric actuators.

The plurality of nozzle outlets may extend through the substrate. In some examples, the plurality of nozzle outlets may be defined, at least partially, by the substrate. In some examples, the plurality of nozzle outlets may be defined, at least partially, by one or more further layers, mounted on the substrate. The fluid communication pathway may extend through the substrate.

Viewed from another aspect, there is provided a method of manufacturing a printhead assembly. The method comprises: manufacturing a first printhead module, a second printhead module and a third printhead module, each manufactured as described hereinbefore; and mounting the first printhead module to the third printhead module via the second printhead module. Thus, the printhead assembly can be formed by mounting printhead modules to each other, instead of mounting the printhead modules solely to a common scaffold structure.

Viewed from another aspect, there is provided a printer comprising the printhead assembly as described hereinbefore, and one or more sources of print agent in fluid connection with the print agent inlet of the print agent manifold of each printhead module. Thus, the printhead assembly can be used in a printer, as will be understood by the person skilled in the art.

Viewed from another aspect, there is provided a method of printing comprising: providing the printer; and operating the control circuitry to eject print agent from at least one of the plurality of printhead nozzles of the plurality of printhead modules. Thus, the printhead assembly of the printer can be operated to print using print agent.

The print agent may be an ink. Alternatively, the print agent may be an additive manufacturing print agent. The print agent will be understood to be substantially any substance capable of being controllably ejected from the plurality of printhead nozzles to be deposited on a surface. The print agent may be liquid. The print agent may be a powder.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1:
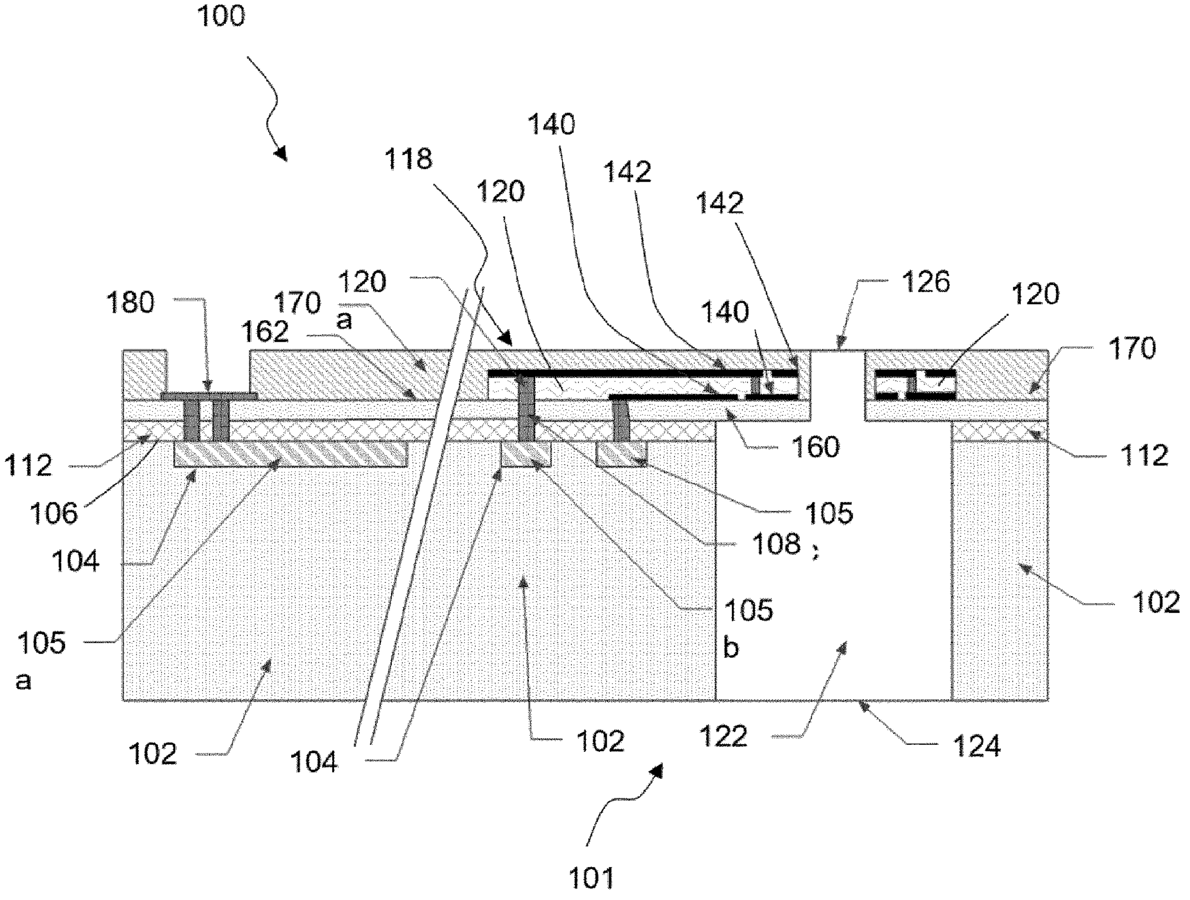
FIG. 1 is a schematic diagram showing an arrangement of an actuator, printhead nozzle and control circuitry as disclosed herein.

FIG. 1 is a schematic diagram showing an arrangement of an actuator, printhead nozzle and control circuitry as disclosed herein. With reference to FIG. 1, a droplet ejector assembly 100 (functioning as the printhead module) according to the invention comprises a silicon substrate 102 comprising control circuitry 104 on the first surface of the silicon substrate 102. The control circuitry 104 is typically an integrated circuit 104 in the form of a CMOS circuit 104. The person skilled in the art will appreciate that a CMOS circuit comprises both doped regions of the substrate and metallisation layers and interconnections formed on the first surface of the substrate. A plurality of layers shown generally as 112 are formed on the first surface 106 of the silicon substrate 102. Layer 112 is the CMOS metallization layer and comprises metal conductive traces and a passivation insulator such as $SiO_2$, SiN, SiON. The droplet ejector assembly 100 further comprises a piezoelectric actuator 118 comprising a piezoelectric body 120 which in this example is formed of AlN or ScAlN but may be formed of another suitable piezoelectric material which is processable at a temperature of below 450° C. The piezoelectric actuator 118 forms a diaphragm with layers of materials such as silicon, silicon oxide, silicon nitride or derivatives thereof and has a passivation layer 160 (sometimes referred to as a nozzle defining layer 160) which prevents applied electrical potentials from contacting fluid.

At least one metallisation layer 112 includes interconnects, conducting signals from an external controller via a bond pad 180 to a first portion 105*a* of the control circuitry 104 and from second and third portions 105*b*, 150*c* of the control circuitry 104 to the piezoelectric actuator via electrical interconnects 108, in particular to first electrodes 140 and second electrodes 142 arranged to apply an electrical potential difference across and thereby actuate the piezoelectric body 120. An opening 120*a* is defined in the piezoelectric body 120 for passage of the electrical interconnect 108 between the second portion 105*b* of the control circuitry 104 and the second electrode 142.

The piezoelectric actuator 118 and accompanying passivation layer 160 defines a wall of a fluid chamber 122 which receives print agent, such as ink (in the case of an inkjet printer) or another printable fluid (for example in the case of an additive manufacturing printer) through a conduit 124 and which is in communication with a printhead nozzle 126 for ejecting liquid. The piezoelectric actuator 118 and the nozzle defining layer 160 further define a wall of the printhead nozzle 126. The conduit 124 forms at least part of a print agent manifold providing a fluid communication pathway between a print agent inlet (not shown in FIG. 1) and the printhead nozzle 126 (as well as further printhead nozzles, not shown in FIG. 1). The conduit 124 is defined by the silicon substrate 102, the metallisation layer 112 and the nozzle defining layer 160. A protective front surface 170 provides the external surface of the droplet ejector assembly 100, provided to cover and protect the piezoelectric actuator 118, and abutting against a surface 162 of the nozzle defining layer 160. The protective front surface 170 has apertures which define the nozzles 126. The piezoelectric actuator 118, chamber 122 and nozzle 126 together form a droplet ejector shown generally as 101.

Typically, the CMOS control circuit comprises patterned regions of doped silicon and metallisation layers. The number of metallisation layers depends on the complexity of the CMOS control circuit but three layers should suffice for many applications.

Although only one printhead nozzle 126 and piezoelectric actuator 118 is shown in FIG. 1, it will be understood that a plurality of printhead nozzles 126 and corresponding piezoelectric actuators 118 are typically provided. Each piezoelectric actuator 118 is configured to control ejection of print agent from the respective printhead nozzle 126.

Figure 2:
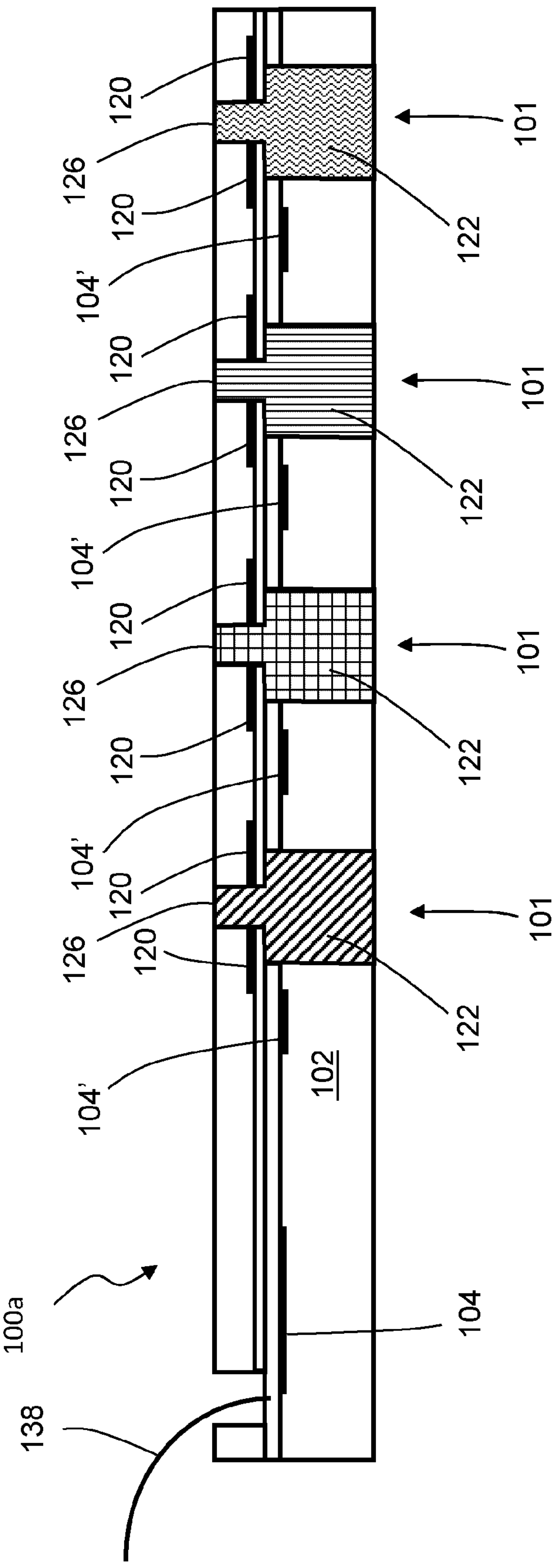
FIG. 2 is an illustration of the arrangement shown in FIG. 1, including a plurality of printhead nozzles.

FIG. 2 shows an illustration of the arrangement shown in FIG. 1, including a plurality of printhead nozzles. With reference to FIG. 2 specifically, which shows a printhead module 100*a* having multiple droplet ejectors 101 (individual piezoelectric actuators, fluid chambers and droplet ejection outlets), flexible cable interconnect 138 with a limited number of signal conductors connects an external controller through wires to the printhead module 100*a* that comprises multiple droplet ejectors shown as 101, for ejecting different print agents, for example ink of different colours. The piezoelectric actuators 118, the control circuitry 104 and the printhead nozzles 126, forming multiple droplet ejectors 101, are typically formed from a single CMOS/actuator substrate, though the print agent manifold of each printhead module 100*a* may be at least partly defined by at least one further component provided in fluid communication with the printhead nozzles 126. In these examples, as well as the main portion of CMOS control circuit 104, the CMOS control circuit includes separate circuit elements 104' associated with each droplet ejector, which may for example comprise a latch and an ejector transistor for each piezoelectric actuator.

Figure 3A:
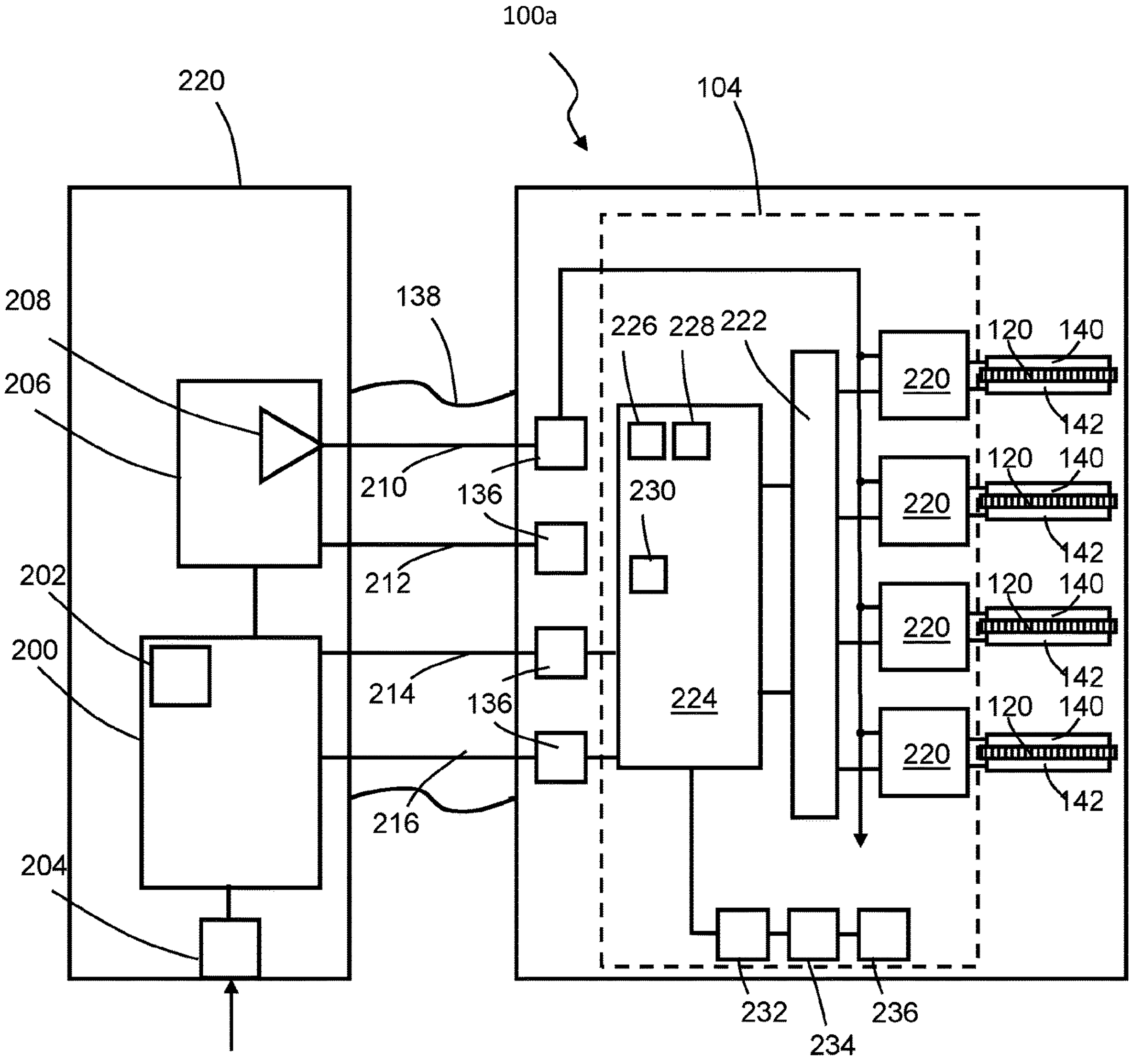
FIGS. 3*a* and 3*b* are block diagrams of control circuitry for a printhead as disclosed herein.

FIG. 3*a* is a block diagram of the control circuitry fora printhead assembly. In this example, actuator control is distributed between a machine controller 220 and the control circuitry (e.g., CMOS circuit) 104 within the printhead module 100*a*. They are connected in part by conductors extending through a single or multiple flexible cable interconnects 138. Multiple actuators 120 are controlled by the application of potentials to their electrodes 140, 142. The machine controller comprises at least a processor 200, such as a microprocessor or microcontroller which has memory 202 storing relevant data and program code. A wired or wireless electronic interface 204 receives input data from an external device driver. One skilled in the art will appreciate that the machine controller may be distributed between a number of separate components or functional modules, such as one component which converts an image into a pixelated pattern for printing using a dither matrix, for example, and a separate component which converts the pixelated pattern into a print pattern for the different nozzles.

The machine controller may comprise at least one waveform generator and a voltage amplifier 208 which provides a continuous pattern of actuator control pulses (shown in FIG. 4) to the printhead through one or more drive signal conductors 210. A ground conductor 212 also extends from the machine controller to the droplet ejector assembly 100. (Ground connections within printhead not shown for clarity). The processor 200 generates digital control signals 214 typically as a serial bus, and also transmits clock signals 216 to the printhead which serve to synchronise printing with movements of the printhead. The connector also provides voltage levels associated with the operational voltage of CMOS control electronics.

Within the printhead module 100*a*, contact pads 136 are connected to the conductors of the flexible connector and signals are routed through patterned metallised layer 112 to the CMOS control circuit 104 and from the CMOS control circuit to the electrodes 140, 142 which actuate individual piezoelectric bodies 120 within respective piezoelectric actuators. The control circuit 104 on substrate 102 comprises ejection switch circuit 220, including ejection transistors having outputs which are in direct electrical connection with the electrodes 140, 142 (i.e. without a further intervening switching semiconductor junction). The ejection switch circuit switches the actuator control pulse signals and if one of the electrodes remains connected to ground, the ejection switch circuit may be as simple as single transistor per actuator, or a single transistor per electrode to switch the signal applied to that electrode. The ejection switch circuit may be distributed around the substrate with a portion (e.g. a transistor or transistor and latch) proximate each droplet ejector.

The ejection switch circuit does not carry out power amplification. Instead it switches the actuator control pulses, determining whether each pulse is relayed to the respective actuator or not, for each pulse. Voltage amplification is carried out in the machine controller by amplifier 208.

The ejection switch circuit is controlled by latch and shift transistors 222, which receive and store digital data from a control circuit 224 which processes received data, for example converting received serial data, storing these in registers 226 and using the received data to determine which actuators are to actuate during each successive actuator firing events. The control circuit 228 also stores trim data used to customise the precise timing of voltage switching for each actuator, which is typically determined during a calibration step on set-up, and may store configuration data 230 which indicates the physical layout of nozzles, security information and or nozzle actuation count history information. The control circuit 224 also receives data from sensors 232, 234, 236, some of which are associated with individual actuators, for example nozzle fill levels sensors, and some of which sense parameters relevant to the function of the printhead as a whole, for example temperature sensors.

Figure 3B:
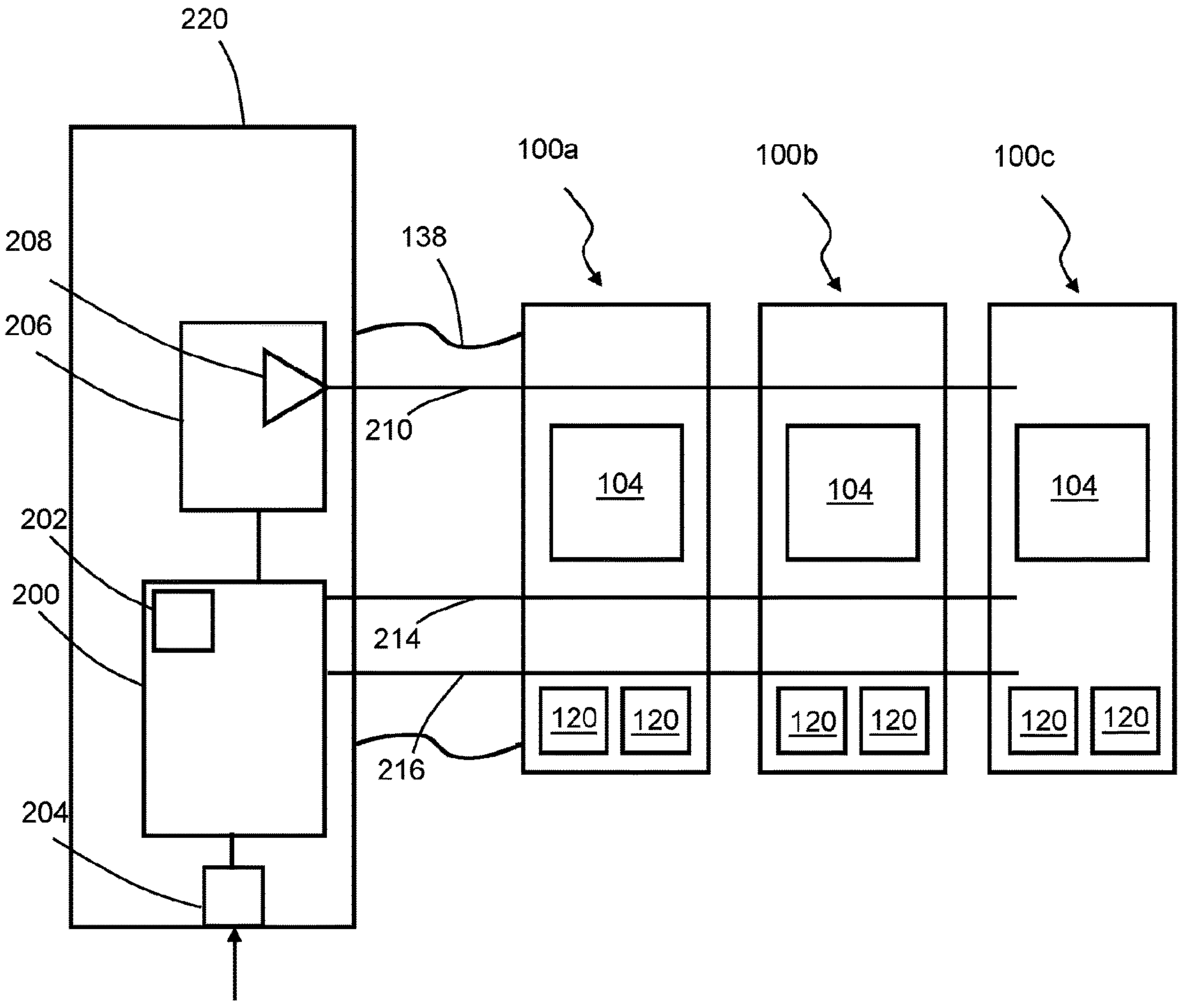

FIG. 3*b* is a further block diagram for control circuitry for a printhead assembly. The control circuitry is substantially similar to that described in relation to FIG. 3*a*, but the electrical signals (e.g. the actuator control pulses via drive signal conductors 210, the digital control signals 214 and the clock signals 216) are transferred to the printhead modules 100*a*, 100*b*, 100*c* together. In other words, the electrical signals 210, 214, 216 are transferred to the third printhead module 100*c* via the first printhead module 100*a* and the second printhead module 100*b*. In this way, it will be understood that electrical connection between the machine controller 220 and the plurality of printhead modules 100*a*, 100*b*, 100*c* can be provided even where the machine controller 220 is only directly electrically connected to the first printhead module 100*a*.

Each printhead module 100$a$, 100$b$, 100$c$ includes control circuitry 104 and a plurality of (e.g. at least two) actuators 120, and the electrical signals can provide actuation of any combination of one or more of the actuators 120 on any of the plurality of printhead modules 100$a$, 100$b$, 100$c$ via the control circuitry 104 on each printhead module 100$a$, 100$b$, 100$c$. Each of the electrical signals 210, 214, 216 is electrically connected to the control circuitry 104 of each of the printhead modules 100$a$, 100$b$, 100$c$.

The electrical signals typically comprise address information indicative of the particular printhead module 100$a$, 100$b$, 100$c$, as well as the particular actuator 120 on the given printhead module 100$a$, 100$b$, 100$c$, to be operated to cause ejection of print agent from the printhead nozzle associated with the operated actuator 120.

Figure 4:
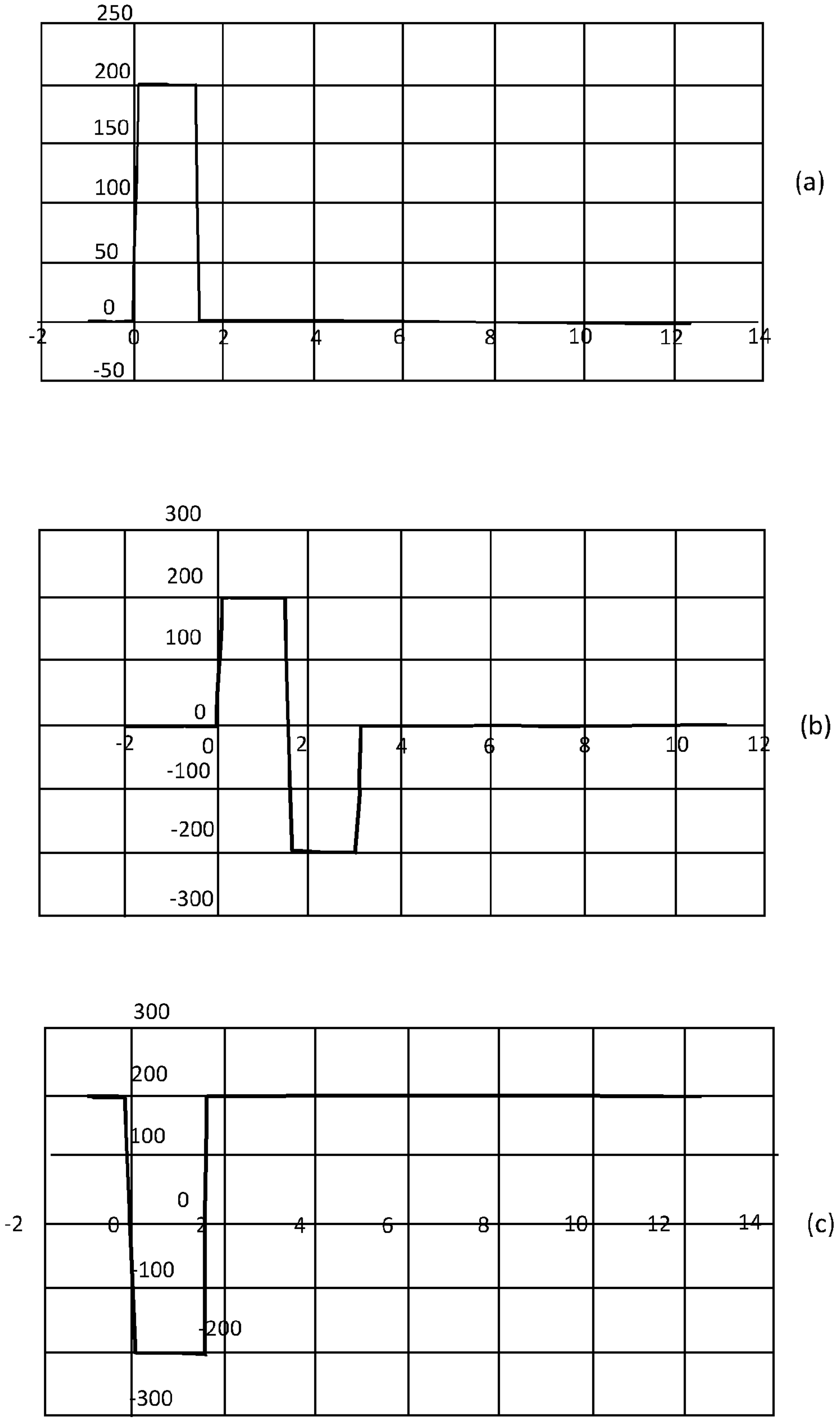
FIGS. 4*a*, 4*b* and 4*c* are graphical representations of actuator control signals for the circuitry described herein.

FIGS. 4($a$), 4($b$) and 4($c$) show three possible drive waveforms generated by waveform generator or voltage amplification 206 in alternative embodiments. The x axis is time (in milliseconds) and the y axis is potential per μm thickness of actuator. As the piezoelectric bodies are made of a non-ferroelectric material in this example the pulses may be applied in either direction. In FIG. 4($a$) the signals have a default voltage of 0 and in each pulse are switch to a positive potential and back to zero after a predetermined period of time. In FIG. 4($b$) the signals have a default voltage of 0 and are switched first to a positive potential (to cause the piezoelectric actuator to deform in one direction) and then to a negative potential (to cause the piezoelectric actuator to deform in the opposite direction) before returning to zero. In FIG. 4($c$) the signals have a default voltage of 200V and are switched to a voltage of −200V (causing the electric fields in the piezoelectric body to reverse in direction) before returning to 200V.

During operation, the processor 200 receives printing data, such as bitmaps, in digital form through interface 204 and processes this data by known means to send a sequence of printing instructions through serial connection 216 to each printhead module. These printing instructions may be as detailed as instructions for each printhead module as to whether and when to eject a droplet during printing cycles. In one embodiment, the waveform generator generates repeating voltage pulses suitable for application to the electrodes of individual piezoelectric actuators. These are periodic with a time spacing which determines the time between droplet ejection events on the printhead. Alternatively, the voltage amplification, 208, may provide and maintain a single voltage level of multiple voltage levels to the printhead assembly. The ejection transistors within the printhead module will switch these voltages according to the CMOS control circuit.

As the waveform generator or generators are not located on the printhead and is used to drive numerous piezoelectric actuators, it or they can generate a significant amount of heat without causing problems. There are not substantial substrate space limitations so it or they may be relatively complex circuits adapted to carefully control the shape of the waveform, with selected, and optionally variable, slew rates, and the power amplifier may be selected to produce the desired voltage up to the maximum possible current requirement in the event that all actuators which may be actuated simultaneously be actuated together.

The control circuit 224 on an individual printhead substrate receives the printing instructions through serial connection 216 and processes these (for example converting from serial to parallel instructions). With reference to the clock signals 214, it is determined whether each individual piezoelectric actuator should be actuated to eject a droplet during each printing cycle and this data is loaded into latches 222. At an appropriate time during each printing cycle, the latched data is passed to the ejection switch circuit which thereby either switch the received printing waveform to the electrodes of the respective actuator element, causing it to carry out a droplet ejection cycle, or to not do so in which case both electrodes of the respective actuator element remain connected to ground and the droplet ejector does not carry out a droplet ejection cycle.

Sensors 232, 234, 236 are monitored during printing. The precise timing of switching the received printing waveform to the electrodes of the respective actuator element can be varied responsive to a measure of temperature using a temperature sensitive CMOS element.

Each nozzle may have slightly different ejection characteristic behaviour (drop volume, velocity) based on variance in wafer manufacturing (on a single wafer—or between wafer lots), due to printhead assembly, due to actuation lifetime. This data can be used to alter the drive waveform for specific nozzles by the CMOS control circuit—for example—changing the actuation pulse duration or switching to a different level—or to switch certain nozzles to different drive waveforms.

The viscosity and surface tension of some inks is highly sensitive to temperature—this ultimately changes the droplet ejection characteristics. Certain print patterns will result in certain nozzles firing continuously whereas others fire sporadically. This will result in a variable heat pattern. The monitored temperature can be used by the control circuit to modify waveforms and/or feedback control information to the controller for appropriate action such as reducing print speed etc.

The shift registers move the droplet fire pattern information through to the latch registers. Thus, the shift registers interface with the serial connection, and move all print data to the latch registers in a given print cycle. The latch registers interface with the ejection registers to initiate a print command.

Figure 5:
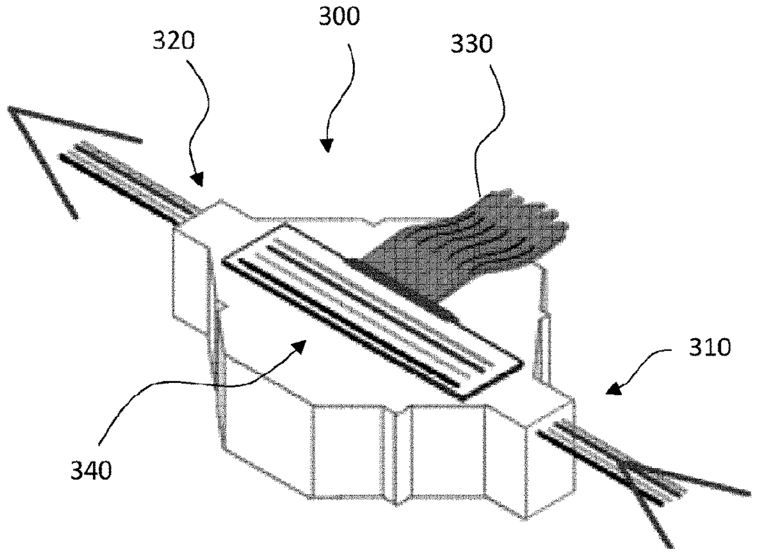
FIG. 5 shows an examples of a printhead module as disclosed herein.
Figure 6:
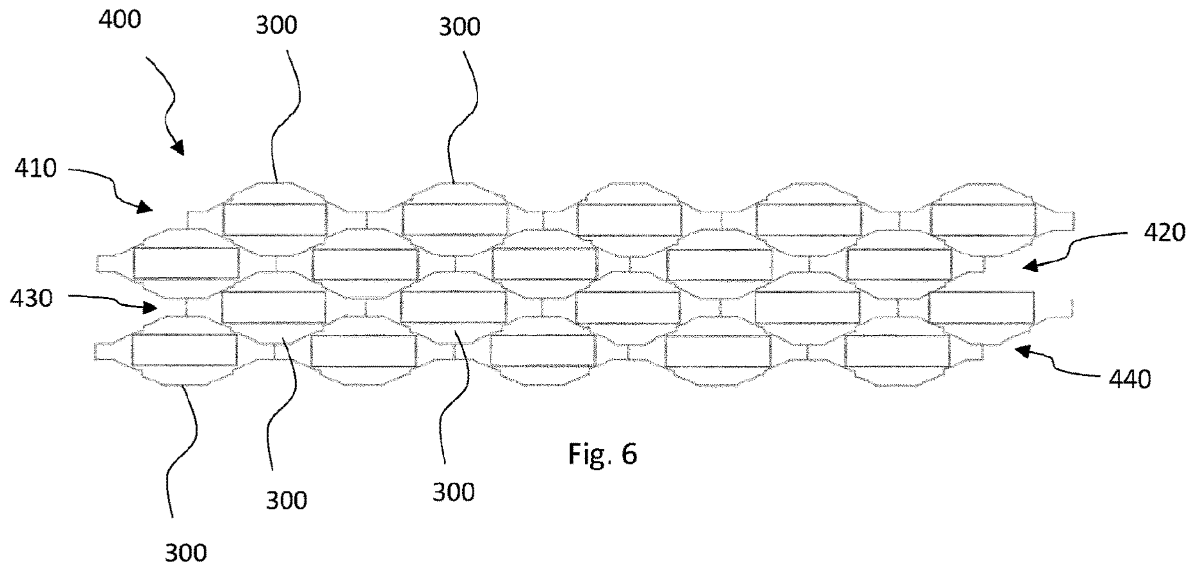
FIG. 6 shows an arrangement of a plurality of the printhead modules shown in FIG. 5.

FIG. 5 shows a printhead module 300 as disclosed herein, and to be connected to a plurality of other printhead modules (as shown in FIG. 6). The printhead module 300 includes a print agent inlet 310, in the form of a plurality of print agent inlets 310. Print agent enters the printhead module 300 through the print agent inlet 310, and can be internally routed in one or more print agent manifolds (not shown in FIG. 5), to a plurality of printhead nozzles as described hereinbefore. In this example, the print agent inlet 310 is on a lateral side of the printhead module 300. The printhead module 300 further includes a print agent outlet 320, through which print agent not expelled from the printhead module 300 through the printhead nozzles, can be relayed to further printhead modules connected to thereto. In other words, the print agent outlet 320 is configured to align with the print agent inlet 310 of a further printhead module.

The printhead nozzles are provided in a print region 340, from which print agent is to be controllably ejected in operation of the printhead module 300.

The or each of the print agent manifolds may be specific to the particular printhead module 300. The surface properties of the print agent manifolds may be configured to match the print agent to be supplied thereto.

Control and/or power signals are provided to the printhead module 300 via a flexible interconnect 330.

FIG. 6 shows an arrangement 400 of a plurality of printhead modules 300, connected together in an assembled arrangement. In the present example, there are four rows of printhead modules 300, each row including five printhead modules 300, though it will be understood that other configurations are possible.

Although only five printhead modules 300 are labelled in FIG. 6 for clarity, it will be understood that FIG. 6 includes a total of 20 printhead modules 300.

From FIG. 6, it will be seen that the plurality of printhead modules 300 tesselate perfectly, meaning that there are no gaps therebetween, thereby providing a particularly space-efficient arrangement of printhead modules 300. However, in other examples, there may be spaces between some portions of the printhead modules 300.

The arrangement 400 includes a first row 410, a second row 420, a third row 420 and a fourth row 440. The second row 420 is offset from the first row 410, such that the print regions 340 of the printhead modules 300 in the first row 410 laterally only partially overlap the print regions 340 of the printhead modules 300 in the second row 420. The third row 430 and the fourth row 440 are offset in a similar way to the first row 410 and the second row 420, such that the print regions 340 of the third row 430 are substantially laterally matched with the print regions 340 of the first row 410, and the print regions 340 of the fourth row 440 are substantially laterally matched with the print regions 340 of the second row 420. Thus, in some examples, the fourth row 440 can provide redundancy for the second row 420, and the third row 430 can provide redundancy for the first row 410. In other examples, different print agents can be provided to the printhead nozzles of the corresponding printhead modules in the overlapping rows.

The arrangement 400 of printhead modules shown in FIG. 6 can be used to provide redundancy in the printhead modules 300.

It will be understood that the shape of the printhead module 300 is not limited to that shown, and could be in any suitable shape to be connected to further printhead modules 300.

Figure 7:
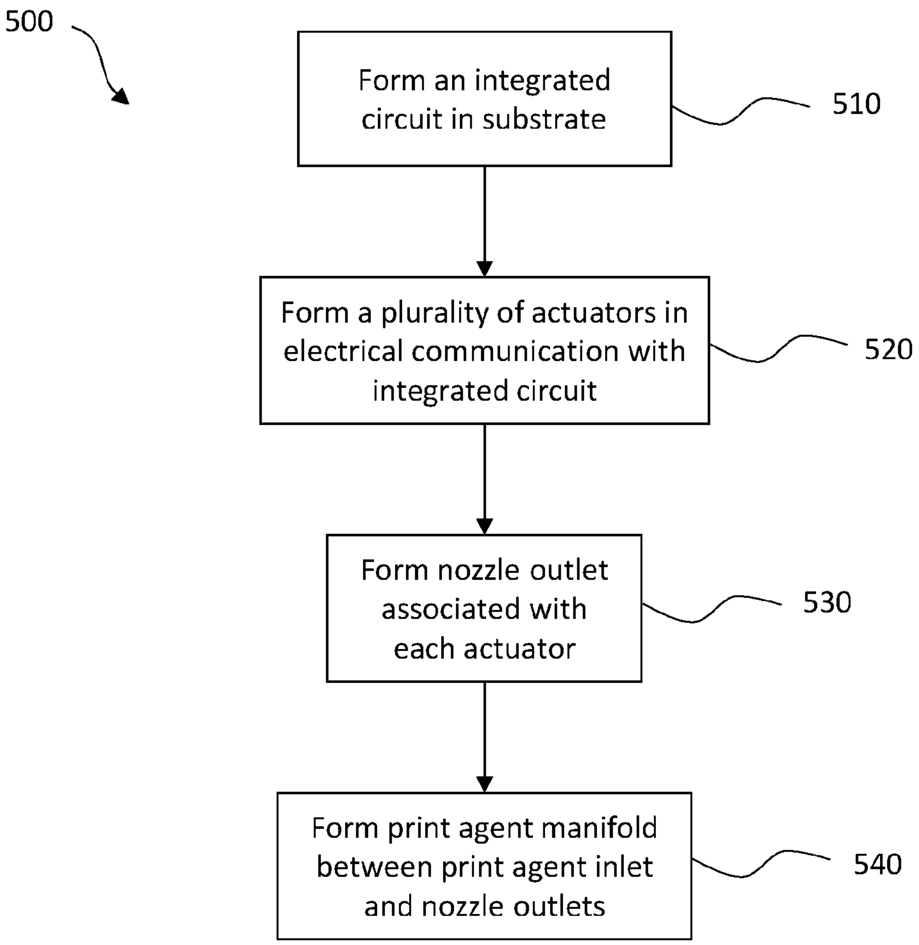
FIG. 7 illustrated a method of manufacture of a printhead module.

FIG. 7 shows a flowchart illustrating a method of manufacturing a printhead module. The method 500 of manufacturing a printhead module comprises forming 510 an integrated circuit (e.g. the CMOS control circuit 104, 134 and the metal interconnect layer 112) on the substrate 102. The CMOS circuit is formed by standard CMOS processing methodologies including ion implantation on a p-type or n-type substrate and the interconnect later is also formed by standard processes such as ion implantation, chemical vapour deposition, physical vapour deposition, etching, chemical-mechanical planarization and/or electroplating.

Additional layers of material are formed on the substrate, including the electrodes 140 and 142, with an intervening piezoelectric body using successive thin film deposition techniques. Thus, the method 500 further comprises forming 520 a plurality of actuators (typically piezoelectric actuators), each to be in electrical communication with the integrated circuit. Each step must avoid damage to the CMOS control circuit. The piezoelectric body is formed of a material such as AlN or ScAlN which may be deposited at a temperature below 450° C. by PVD (including low-temperature sputtering). Electrodes are formed of, for example titanium, platinum, aluminium, tungsten or alloys thereof.

The method 500 further comprises forming 530 a nozzle outlet associated with each actuator. In other words, a plurality of nozzle outlets are formed. Each nozzle outlet is associated with a respective one of the plurality of actuators. Each nozzle outlet extends through the substrate. Typically, each nozzle outlet further extends through one or more further layers on the substrate. The method 500 also comprises forming 540 a print agent manifold for routing print agent therethrough towards the plurality of nozzle outlets. The print agent manifold may be formed before or after the formation of the nozzle outlets. The print agent manifold may be formed before or after the formation of the plurality of actuators. The print agent manifold is a fluid channel defining a fluid communication pathway between a print agent inlet of the printhead module, and the plurality of nozzle outlets. Fluid channels and apertures through the substrate may be formed using etching procedures such as DRIE. Channel defining layer 128 may be formed using DRIE etch and wafer bonding of silicon MEMS substrates. The nozzle defining layer can be formed of metal, silicon MEMS wafer or a plastics material by deposition on or adhesion to the channel defining later. Each droplet ejector chip is connected to the machine controller via a flexible interconnect. In contrast to prior art devices according to FIG. 1, the number of discrete conductors in the flexible interconnect is limited, for example 4 to 16 conductors.

The material from the which the piezoelectric body is formed cannot be and is not PZT due to the requirement to avoid damaging the CMOS control circuit upon which the piezoelectric actuator, including the piezoelectric body is formed. Accordingly, the piezoelectric actuator has a piezoelectric constant $d_{31}$ which is much lower, usually at least one and potentially two orders of magnitude, less than PZT depending on its precise composition.

It will be understood that the printhead modules may have alternative configurations from those described herein.

The flexible interconnect may be mounted to an edge of a printhead assembly and used to drive several or many individual printhead modules, for example printhead modules for different colours of ink (or other materials in the case of an additive printer) or droplet ejectors for different colours of ink (or other materials) may all be formed in a single continuous substrate in an individual printhead module.

In an alternative embodiment, instead of the machine controller including a waveform generator and the waveform being conducted to the printhead modules and the CMOS control circuit thereon, the CMOS control circuit actuates the piezoelectric actuators, causing droplet ejection, by switching the voltage applied to one or more of the electrodes of each piezoelectric actuator, for example between ground and a fixed voltage, or between multiple fixed voltage levels, one or more of which may be ground. In this case, the flexible connector 138 contains one or more electrical conductors carrying a fixed voltage from the machine controller to the printhead module.

In summary, there is provided a printhead assembly comprising: a plurality of printhead modules (100*a*), including a first printhead module, a second printhead module and a third printhead module. Each of the plurality of printhead modules (100*a*) comprises: a plurality of printhead nozzles (126) each provided with an actuator (118) for selectively ejecting print agent therefrom; at least one print agent manifold (122, 124) providing a fluid communication pathway between at least one print agent inlet and the plurality of printhead nozzles (126); and control circuitry (104) to control the actuators (118) of the printhead module (100*a*) to eject print agent from the printhead nozzles (126). The first printhead module is mounted to the third printhead module via the second printhead module.

The invention claimed is:

1. A printhead assembly comprising:
a plurality of printhead modules, including a first printhead module, a second printhead module and a third printhead module, each of the plurality of printhead modules comprising:
a plurality of printhead nozzles each provided with an actuator for selectively ejecting print agent therefrom;
at least one print agent manifold providing a fluid communication pathway between at least one print agent inlet and the plurality of printhead nozzles; and
control circuitry to control the actuators of the printhead module to eject print agent from the printhead nozzles,
wherein the control circuitry comprises a CMOS circuit, and
wherein the first printhead module is mounted to the third printhead module via the second printhead module.

2. The printhead assembly of claim 1, wherein the actuator is a piezoelectric actuator.

3. The printhead assembly of claim 1, wherein the at least one print agent manifold of the first printhead module is different from the at least one print agent manifold of the second printhead module.

4. The printhead assembly of claim 1, wherein the first printhead module is configured to be operatively coupled to a first print agent to be ejected by a first subset of the plurality of printhead nozzles of the first printhead module, and further operatively coupled to a second print agent to be ejected by a second subset of the plurality of printhead nozzles of the first printhead module, the second print agent different from the first print agent and the second subset distinct from the first subset.

5. The printhead assembly of claim 1, further comprising a first module connector for connecting the first printhead module to the second printhead module and a second module connector for connecting the second printhead module to the third printhead module.

6. The printhead assembly of claim 1, wherein the at least one print agent manifold of the second printhead module is arranged to receive the print agent at the at least one print agent inlet from at least one print agent outlet of the first printhead module in fluid communication with the at least one print agent inlet of the second printhead module, or
wherein the at least one print agent manifold of the second printhead module is arranged to receive the print agent at the at least one print agent inlet from a print agent outlet defined in a further print agent manifold, different from the plurality of printhead modules.

7. The printhead assembly of claim 1, wherein the plurality of printhead modules are arranged in a tessellating pattern, and/or wherein the plurality of printhead modules each have a substantially identical external shape.

8. The printhead assembly of claim 1, wherein each printhead module comprises at least 100 printhead nozzles.

9. The printhead assembly of claim 1, wherein the third printhead module is electrically connected to the first printhead module via the second printhead module, such that control signals supplied to the first printhead module can be received by the control circuitry of the third printhead module.

10. A first printhead module for connection to a further printhead module having a substantially identical external shape as the first printhead module, the first printhead module comprising:
a plurality of printhead nozzles each provided with an actuator for selectively ejecting print agent therefrom;
at least one print agent manifold providing a fluid communication pathway between at least one print agent inlet and the plurality of printhead nozzles;
control circuitry to control the actuators to eject print agent from the printhead nozzles, wherein the control circuitry comprises a CMOS circuit; and
a connection portion arranged to facilitate mounting of the first printhead module to the further printhead module.

11. A method of manufacturing a printhead module comprising:
forming an integrated control circuit in a substrate;
forming a plurality of piezoelectric actuators each in electrical communication with the integrated control circuit;
forming a plurality of nozzle outlets, each associated with a respective one of the plurality of piezoelectric actuators; and
forming at least one print agent manifold defining a fluid communication pathway between at least one print agent inlet and the plurality of nozzle outlets.

12. A method of manufacturing a printhead assembly, the method comprising: manufacturing a first printhead module, a second printhead module and a third printhead module, each according to the method of claim 11; and
mounting the first printhead module to the third printhead module via the second printhead module.

13. A printer comprising the printhead assembly of claim 1, and one or more sources of print agent in fluid connection with the at least one print agent inlet of the at least one print agent manifold of each printhead module.

14. A method of printing comprising:
providing the printer of claim 13; and
operating the control circuitry to eject print agent from at least one of the plurality of printhead nozzles of the plurality of printhead modules.

* * * * *